(12) United States Patent
Peng

(10) Patent No.: US 10,581,240 B2
(45) Date of Patent: Mar. 3, 2020

(54) PROTECTIVE CIRCUIT WITH LOW POWER CONSUMPTION

(71) Applicant: Chicony Power Technology Co., Ltd., New Taipei (TW)

(72) Inventor: Tso-Jen Peng, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 366 days.

(21) Appl. No.: 15/642,006

(22) Filed: Jul. 5, 2017

(65) Prior Publication Data

US 2018/0309287 A1    Oct. 25, 2018

(30) Foreign Application Priority Data

Apr. 25, 2017 (TW) .............................. 106113762 A

(51) Int. Cl.
| | |
|---|---|
| H02H 9/04 | (2006.01) |
| H02H 1/00 | (2006.01) |
| G06F 1/30 | (2006.01) |

(52) U.S. Cl.
CPC ................. *H02H 9/04* (2013.01); *G06F 1/30* (2013.01); *H02H 1/0007* (2013.01)

(58) Field of Classification Search
None
See application file for complete search history.

(56) References Cited

U.S. PATENT DOCUMENTS

| 4,507,938 | A | * | 4/1985 | Hama | ................. | F24D 11/0214 |
| | | | | | | 62/324.1 |
| 4,589,475 | A | * | 5/1986 | Jones | .................... | G05D 23/24 |
| | | | | | | 165/293 |
| 6,671,189 | B2 | | 12/2003 | Jansen et al. | | |
| 7,345,896 | B2 | | 3/2008 | Dalal | | |
| 7,782,002 | B2 | | 8/2010 | Cook, II | | |

FOREIGN PATENT DOCUMENTS

| CN | 2609274 Y | 3/2004 |
| CN | 1897435 A | 1/2007 |
| CN | 2857298 Y | 1/2007 |
| CN | 101494412 A | 7/2009 |
| CN | 201328102 Y | 10/2009 |
| CN | 102003689 A | 4/2011 |
| CN | 103107696 A | 5/2013 |
| CN | 105322810 A | 2/2016 |
| TW | M481439 U | 7/2014 |
| TW | 201500878 A | 1/2015 |

OTHER PUBLICATIONS

Chinese Patent Office. Office Action, dated Mar. 28, 2019, China patent application 201710320486.0, 8 pages.
Taiwan Search Report with Notice of Allowance dated Mar. 16, 2018 of Taiwan patent application No. 106113762, 3 pages.

* cited by examiner

*Primary Examiner* — Stephen W Jackson
(74) *Attorney, Agent, or Firm* — Muncy, Geissler, Olds & Lowe, PC

(57) ABSTRACT

A protective circuit with low power consumption includes a load detection module, a feedback control module, and a protective discharge module. The load detection module detects a detection voltage of the current detection unit. When the detection voltage detected by the load detection module is less than a determined voltage value, the protective discharge module is configured to turn off the isolation switch to disconnect an output voltage outputted from the protective circuit.

10 Claims, 6 Drawing Sheets

PROTECTIVE CIRCUIT WITH LOW POWER CONSUMPTION

BACKGROUND

Technical Field

The present invention relates to a protective circuit with low power consumption, and more particularly to a protective circuit applied to a limited power source (LPS) of a power delivery (PD) production.

Description of Related Art

In order to meet different input voltage requirements of various electronic products, a power deliver (PD) device for supporting multi output voltages is developed to provide the required input voltage to the corresponding electronic product. Also, the PD device operated at different voltage levels of the output voltage has to meet the standard of the limited power source (LPS).

In particular, protection mechanisms of the protective circuit provided by the PD device have to meet the standard of the LPS, namely the output current cannot exceed the maximum output current, such as 8 amperes and the output power cannot exceed the maximum output power, such as 100 watts. For example, when the output voltage is 5 volts, the output current has to be limited below 8 amperes, namely the maximum output current. When the output voltage is 15 volts, the output power has to be limited below 100 watts, namely the maximum output power. In other words, if the output power by multiplying the output voltage by the maximum output current is less than 100 watts, the output current has to be limited below the maximum output current, namely 8 amperes. If the output power by multiplying the output voltage by the maximum output current is greater than 100 watts, the output power has to be limited below the maximum output power, namely 100 watts.

In addition, when inner components of the PD device is shorted circuit or open circuit, the protection mechanism needs to be activated by the PD device. Besides the above-mentioned protection requirements of the LPS, the protective circuit needs to activate a normal protection when the conversion module of the PD device is abnormal, thereby avoid affecting the electronic apparatus due to the abnormality of the PD device.

However, the circuit design is complicated and large to increase costs thereof once the protective circuit needs to meet the standard of the LPS and the protection mechanism is activated under the shorted-circuit or open-circuit inner components of the PD device.

SUMMARY

In order to solve the above-mentioned problems, the present invention provides a protective circuit with low power consumption. Accordingly, the protective circuit with low power consumption includes a load detection module, a feedback control module, and a protective discharge module. The load detection module is coupled to a current detection unit. The feedback control module is coupled to the load detection module. The protective discharge module is coupled to the load detection module and an isolation switch. The load detection module detects a detection voltage of the current detection unit. When the detection voltage detected by the load detection module is less than a determined voltage value, the protective discharge module turns off the isolation switch to disconnect an output voltage outputted from the protective circuit.

In one embodiment, the load detection module is further coupled to a primary-side load signal module. When the load detection module receives a detection signal outputted from the primary-side load signal module, the load detection module detects the detection voltage according to the detection signal.

In one embodiment, the protective circuit is coupled to a secondary-side circuit of a power factor correction module, and the primary-side load signal module is coupled to the primary-side circuit of the power factor correction module. When an output load is in a light-loading condition, the power factor correction module is disabled, and the primary-side load signal module fails to output the detection signal to the load detection module. When the output load is increased above a middle-loading condition, the power factor correction module normally operates, and the primary-side load signal module outputs the detection signal to the load detection module. The load detection module detects that detection voltage of the current detection unit according to the detection signal.

In one embodiment, when the protective discharge module discharges, the detection voltage is produced at the current detection unit.

In one embodiment, the protective circuit is coupled to a secondary-side circuit of a conversion module. When the protective discharge module discharges, a discharge path is formed by an output path of the secondary-side circuit, the protective discharge module, and the current detection unit. When a current flows to the current detection unit through the discharge path, the detection voltage is produced across two ends of the current detection unit.

In one embodiment, the load detection module is further coupled to a load detection circuit. When the load detection module receives a detection signal provided from the load detection circuit, the load detection module detects the detection voltage.

In one embodiment, the protective circuit is coupled to a secondary-side circuit of a conversion module, and the load detection circuit is coupled to a path of the secondary-side circuit of the conversion module. When the load detection circuit detects that the output load is increased, the load detection circuit outputs the detection signal to the load detection module, and the load detection module detects the detection voltage of the current detection unit according to the detection signal.

In one embodiment, when the isolation switch is shorted circuit, the load detection module notifies the feedback control module to regulate the output voltage to zero.

In one embodiment, the protective circuit further includes a couple unit. The couple unit is coupled to the feedback control module. When the isolation switch is shorted circuit, the load detection module notifies the feedback control module to regulate the output voltage to zero through the couple unit.

In one embodiment, the protective circuit further includes a power transmission communication module. The power transmission communication module is coupled to the feedback control module. When the power transmission communication module externally receives a transmission signal, the power transmission communication module outputs a first signal to the feedback control module, and the feedback control module regulates a voltage level of the output voltage according to the first signal.

In one embodiment, the power transmission communication module is coupled to the protective discharge module.

When the power transmission communication module externally receives the transmission signal to transfer the voltage level of the output voltage from a high voltage level to a low voltage level, the power transmission communication module outputs a second signal to the protective discharge module, and the protective discharge module releases extra energy generated during the transference of the output voltage according to the second signal.

It is to be understood that both the foregoing general description and the following detailed description are exemplary, and are intended to provide further explanation of the present invention as claimed. Other advantages and features of the present invention will be apparent from the following description, drawings and claims.

BRIEF DESCRIPTION OF DRAWING

The present invention can be more fully understood by reading the following detailed description of the embodiment, with reference made to the accompanying drawings as follows.

DETAILED DESCRIPTION

Figure 1:
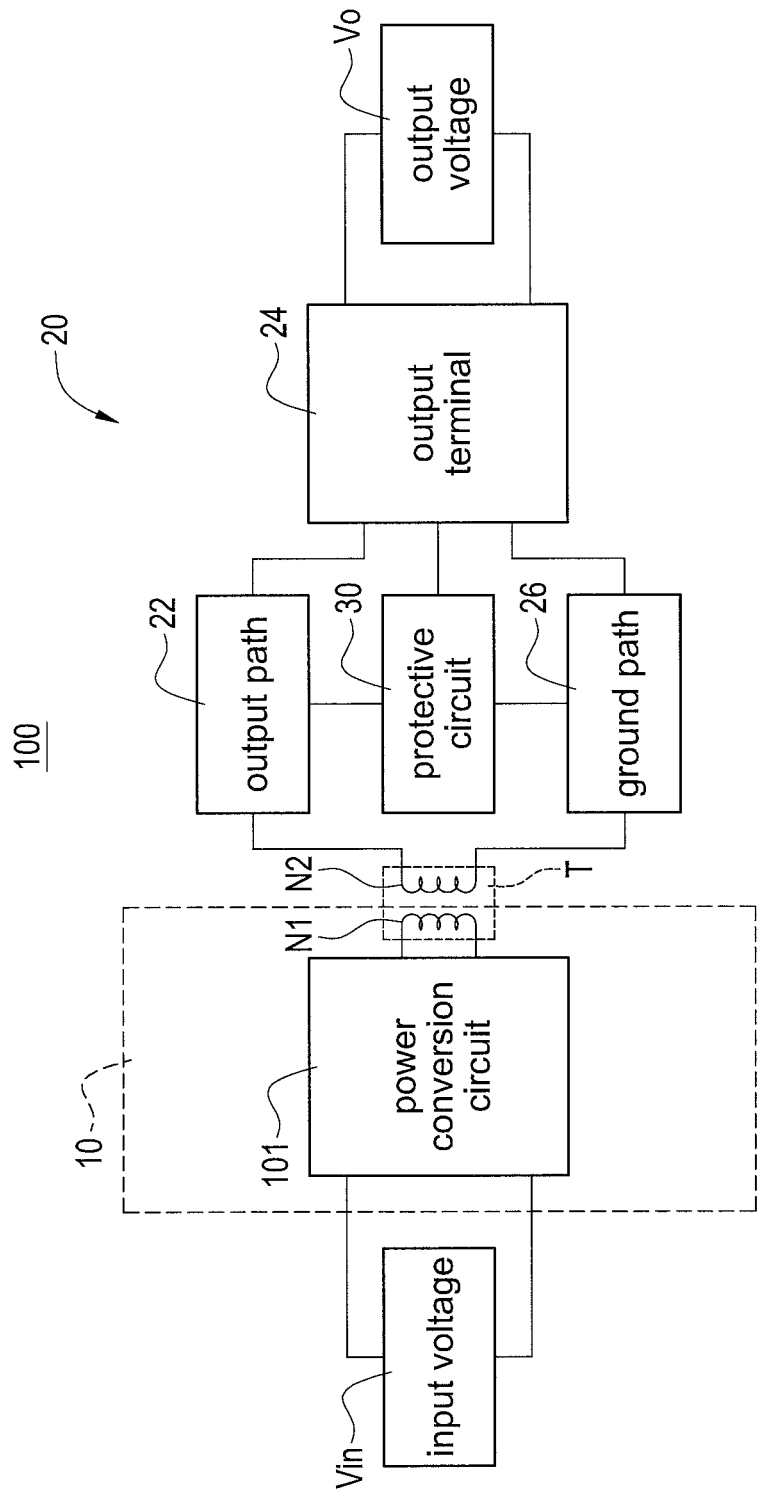
FIG. 1 shows a schematic circuit block diagram of a conversion module according to the present invention.

Reference will now be made to the drawing figures to describe the present invention in detail. It will be understood that the drawing figures and exemplified embodiments of present invention are not limited to the details thereof.

Refer to FIG. 1, which shows a schematic circuit block diagram of a conversion module according to the present invention. The conversion module 100 includes a primary-side circuit 10 and a secondary-side circuit 20. The primary-side circuit 10 includes a primary-side winding N1 and a power conversion circuit 101; the secondary-side circuit 20 includes a secondary-side winding N2. The power conversion circuit 101 may be implemented by active electronic components or passive electronic components, such as diodes, inductors, capacitors, resistors, or switches for power conversion, and therefore the power conversion circuit 101 is not limited to existing circuit architecture. The primary-side winding N1 is a primary-side winding of a transformer, and the secondary-side winding N2 is a secondary-side winding of the transformer. The electrical energy stored in the primary-side winding N1 of the primary-side circuit 10 is magnetically coupled to the secondary-side winding N2 of the secondary-side circuit 20. Therefore, an input voltage Vin is converted into an output voltage Vo by the conversion module 100 through a path from the primary-side circuit 10 to the secondary-side circuit 20. The secondary-side circuit 20 further includes an output path 22, an output terminal 24, and a ground path 26. The output path 22 is coupled between the secondary-side winding N2 and the output terminal 24, and the electrical energy stored in the secondary-side winding N2 is converted into the output voltage Vo by the output path 22 and the output voltage Vo is outputted through the output terminal 24. The ground path 26 is coupled between the secondary-side winding N2 and the output terminal 24. The conversion module 100 further includes a protective circuit 30, and the protective circuit 30 is coupled to the output path 22, the output terminal 24, and the ground path 26. When the protective circuit 30 detects that the conversion module 100 is abnormal through the ground path 26, the protective circuit 30 controls the disconnection of the output path 22 between the secondary-side winding N2 and the output terminal 24 so that the conversion module 100 fails to output the output voltage Vo.

Figure 2:
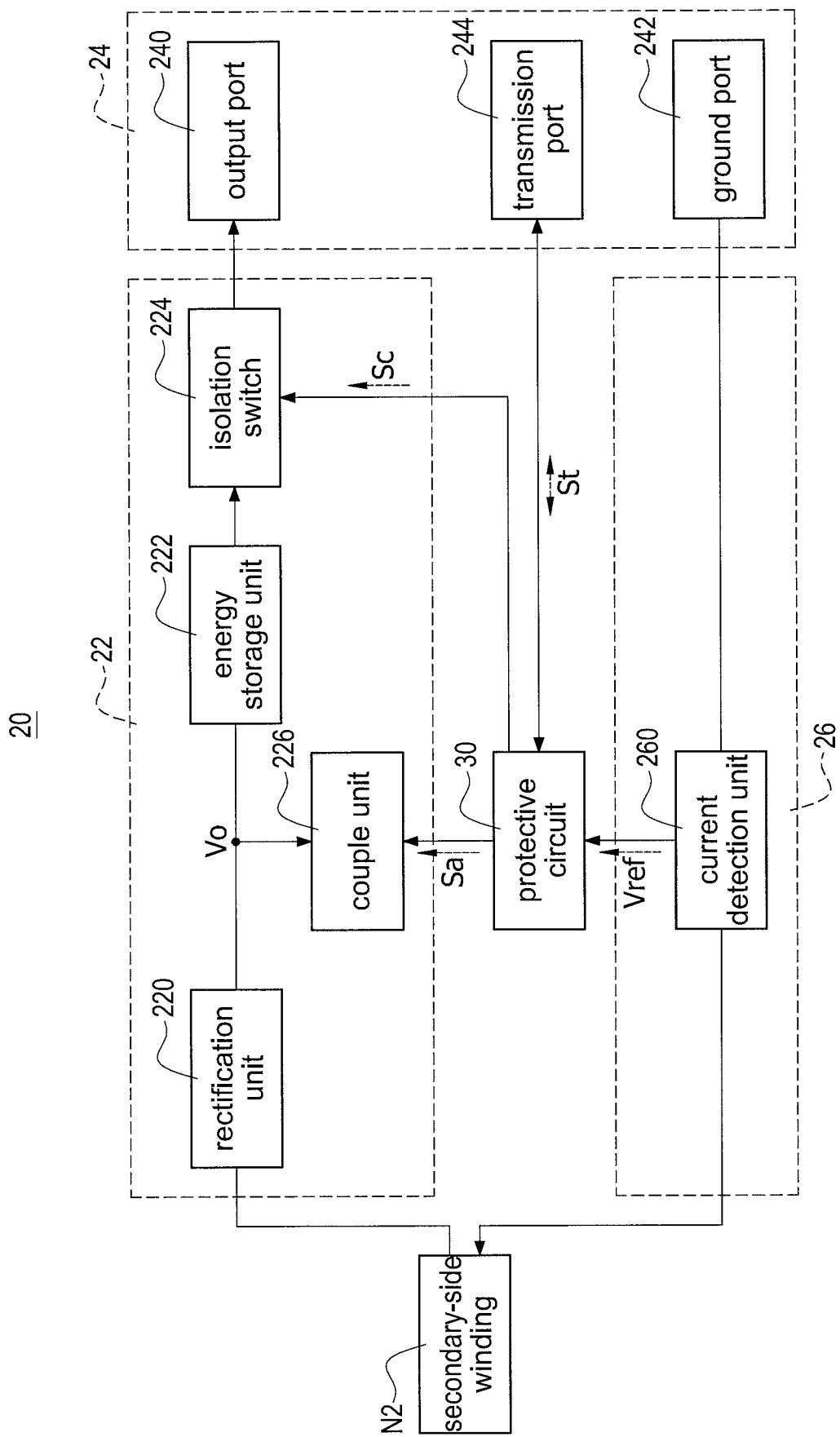
FIG. 2 shows a schematic circuit block diagram of a secondary-side circuit according to the present invention.

Refer to FIG. 2, which shows a schematic circuit block diagram of a secondary-side circuit according to the present invention. The output path 22 includes a rectification unit 220, an energy storage unit 222, an isolation switch 224, and a couple unit 226. The rectification unit 220 is coupled to the secondary-side winding N2 and the energy storage unit 222. The rectification unit 220 rectifies the electrical energy stored in the secondary-side winding N2 into the output voltage Vo, and the output voltage Vo is stored in the energy storage unit 222. The isolation switch 224 is coupled to the energy storage unit 222, the output terminal 24, and the protective circuit 30. When the protective circuit 30 detects that the conversion module 100 is abnormal, the protective circuit 30 outputs a control signal Sc to turn off (disconnect) the output terminal 24 so that the conversion module 100 fails to output the output voltage Vo. The couple unit 226 is coupled to the rectification unit 220, the energy storage unit 222, and the protective circuit 30. The protective circuit 30 modulates the couple unit 226 to stabilize or regulate the output voltage Vo. The couple unit 226 is, for example but limited to, an optical coupler. In other words, a couple unit which can be used to stabilize the output voltage Vo for the protective circuit 30 or regulate the voltage level of the output voltage Vo should be included in the scope of this embodiment. In this embodiment, the isolation switch 224 which can be used to disconnect the output path 22 so as to disconnect the output voltage Vo from the conversion module 100 should be included in the scope of this embodiment.

The ground path 26 includes a current detection unit 260. The current detection unit 260 is coupled to the secondary-side winding N2, the output terminal 24, and the protective circuit 30. The protective circuit 30 detects a detection voltage Vref outputted from the current detection unit 260. When the detection voltage Vref received by the protective circuit 30 is less than a determined voltage value Pv internally set in the protective circuit 30, the protective circuit 30 outputs the control signal Sc to turn off the isolation switch 224. The output terminal 24 includes an output port 240, a ground port 242, and a transmission port 244. The output port 240 is coupled to the isolation switch 224 of the output path 22, and the conversion module 100 outputs the output voltage Vo to a rear-connected electronic apparatus (not shown) through the output port 240. The ground port 242 is coupled to the current detection unit 260 of the ground path 26 to provide a ground path for the rear-connected electronic apparatus. The transmission port 244 is coupled to the protective circuit 30, and the conversion module 100 is communicated with the rear-connected electronic apparatus through the transmission port 244. The electronic apparatus (not shown) can request the conversion module 100 to provide the required voltage level of the output voltage Vo according to a transmission signal St transmitted between the transmission port 244 and the protective circuit 30. When the protective circuit 30 realizes the voltage level of the output voltage Vo through the transmission port 244, the protective circuit 30 outputs a modulation signal Sa to modulate the couple unit 226 so as to regulate the voltage level of the output voltage Vo for the electronic apparatus. In this embodiment, the current detection unit 260 is, for example but not limited to, a resistor. In other words, a current detection unit which can be used to acquire the detection voltage Vref should be included in the scope of this embodiment.

Figure 3:
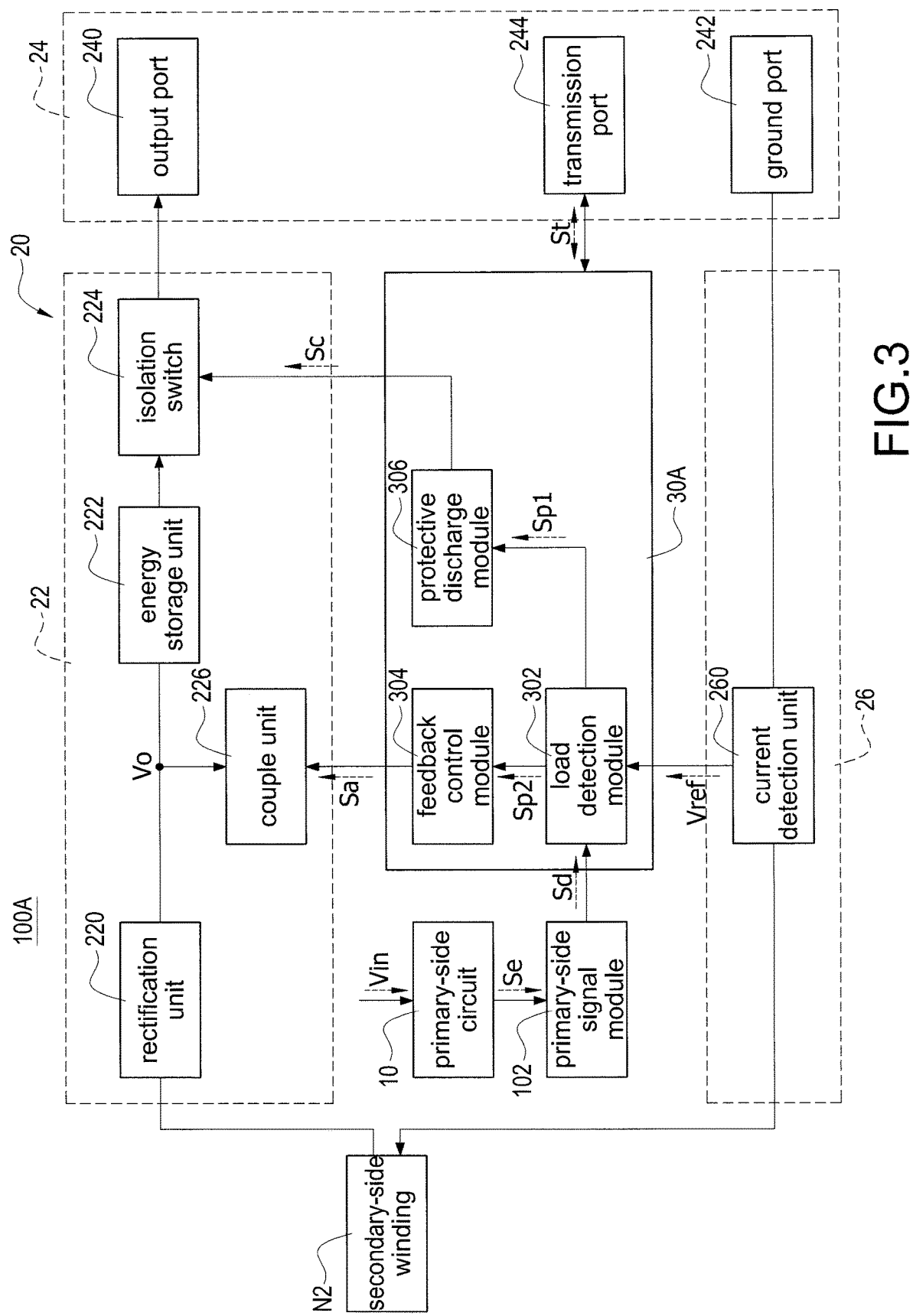
FIG. 3 shows a schematic circuit block diagram of a protective circuit according to a first embodiment of the present invention.

Refer to FIG. 3, which shows a schematic circuit block diagram of a protective circuit according to a first embodiment of the present invention. In this embodiment, the conversion module 100A is a power factor correction module (hereinafter referred to as "PFC module"). The protective circuit 30A receives a signal transmitted from the conversion module 100A to determine whether the protective circuit 30 needs to enter a protection mode. The conversion module 100A, namely the PFC module includes a primary-side load signal module 102 coupled to the primary-side circuit 10, and the primary-side load signal module 102 is used to detect whether the PFC module is normally operated. In addition, the primary-side load signal module 102 receives an activation signal Se outputted from the primary-side circuit 10 and outputs a detection signal Sd to the protective circuit 30A according to the activation signal Se. The protective circuit 30A includes a load detection module 302, a feedback control module 304, and a protective discharge module 306. The load detection module 302 is coupled to the current detection unit 260 and the primary-side load signal module 102. The feedback control module 304 is coupled to the load detection module 302 and the couple unit 226, and the protective discharge module 306 is coupled to the load detection module 302 and the isolation switch 224.

In this embodiment, the PFC module is idle at a light-loading condition. Until an output load is increased above a middle-loading condition, the PFC module normally operates. More specifically, the light-loading condition means that an output current detected by the protective circuit 30A through the output path 22 is less than a current threshold value. In this condition, a PFC function of the PFC module is disabled by controlling the primary-side circuit 10 by the protective circuit 30A, and therefore the input voltage Vin is only converted into the output voltage Vo without the PFC function. Accordingly, the PFC module has a higher efficiency when being operated below the middle-loading condition. On the contrary, the middle-loading condition means that the output current detected by the protective discharge module 306 through the output port 240 is greater than the current threshold value. In this condition, the PFC function of the PFC module is enabled by controlling the primary-side circuit 10 by the protective circuit 30A, and therefore the PFC module is used to convert the input voltage Vin into the output voltage Vo and maintain the overall power factor above 0.9. When the output load is in a light-loading condition, the PFC module is disabled, and the primary-side load signal module 102 does not receive the activation signal Se outputted from the primary-side circuit 10 so that the primary-side load signal module 102 fails to output the detection signal Sd to the load detection module 302. When the output load is increased above a middle-loading condition, the power factor correction module normally operates, and the primary-side load signal module 102 receives the activation signal Se outputted from the primary-side circuit 10. In this embodiment, the primary-side load signal module 102 is, for example but not limited to, coupled to power switches (not shown) of the primary-side circuit 10 and receives the activation signal Se of controlling the power switches. In other words, the primary-side load signal module 102 which can be coupled to other connections to determine whether the PFC module is normal or not should be included in the scope of this embodiment.

In this embodiment, the protective circuit 30A may activate the protection mode under at least two conditions. The first one is: the primary-side load signal module 102 outputs the detection signal Sd to the load detection module 302 when the primary-side load signal module 102 receives the activation signal Se. The load detection module 302 detects the detection voltage Vref of the current detection unit 260 according to the detection signal Sd and determines whether the detection voltage Vref is less than the determined voltage value Pv. In particular, the PFC module normally operates when the load detection module 302 detects that the detection voltage Vref of the current detection unit 260 is greater than the determined voltage value Pv. On the contrary, when the load detection module 302 detects that the detection voltage Vref of the current detection unit 260 is less than the determined voltage value Pv, it means that the current detection unit 260 is shorted circuit to fail to acquire the detection voltage Vref. At this time, the protective circuit 30 immediately enters the protection mode. When the load detection module 302 detects that the detection voltage Vref of the current detection unit 260 is less than the determined voltage value Pv, the load detection module 302 outputs a first protective signal Sp1 to the protective discharge module 306. After the protective discharge module 306 receives the first protective signal Sp1, the protective discharge module 306 outputs the control signal Sc to turn off the isolation switch 224 and disconnect the output path 22 so that the output voltage Vo cannot be outputted from the output port 240.

The second one is: when the isolation switch 224 is shorted circuit, it means that the isolation switch 224 may be faulted so that the control signal Sc outputted from the protective discharge module 306 cannot turn off the isolation switch 224. In particular, when the isolation switch 224 is shorted circuit, the load detection module 302 of the protective circuit 30A detects that the output load is increased over the over current protection (OCP). At this time, the load detection module 302 outputs the first protective signal Sp1 to the protective discharge module 306 so that the protective discharge module 306 outputs the control signal Sc to try to turn off the isolation switch 224. However, the output voltage Vo is continuously provided to the electronic apparatus through the isolation switch 224 and the output port 240 since the isolation switch 224 is shorted circuit and cannot be turned off so that the detection voltage Vref is continuously produced at the current detection unit 260. When the protective discharge module 306 detects that the output load is increased over the OCP, the load detection module 302 outputs the second protective signal Sp2 to the feedback control module 304. When the feedback control module 304 receives the second protective signal Sp2, the feedback control module 304 outputs the modulation signal Sa to the couple unit 226, and the couple unit 226 regulates the output voltage Vo to zero according to the modulation signal Sa. When the output voltage Vo is regulated to zero, a supplying voltage of a control unit (not shown) of the primary-side circuit 10 is reduced below the under voltage lock out (UVLO) so as to disable the control unit of the primary-side circuit 10.

Figure 4:
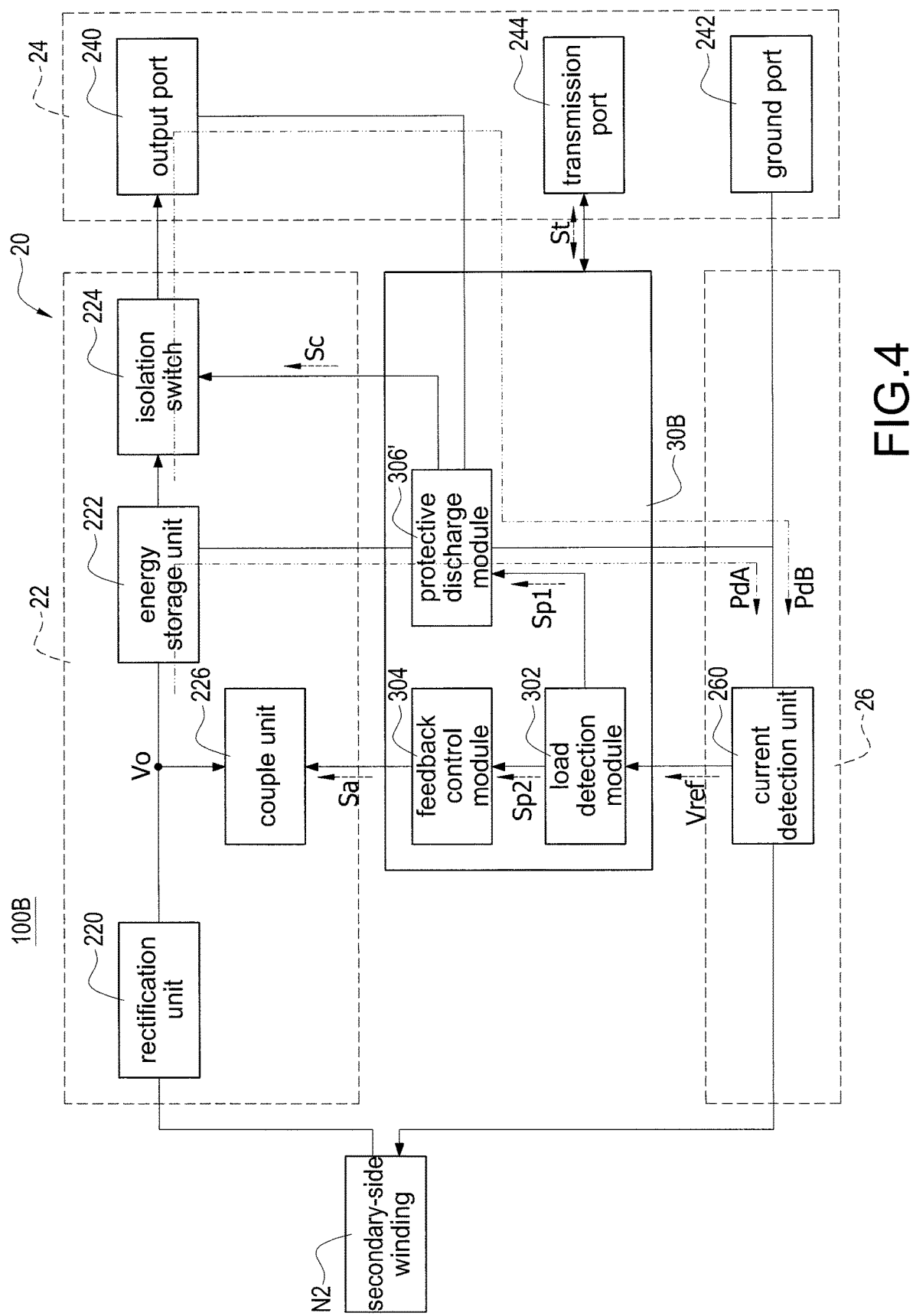
FIG. 4 shows a schematic circuit block diagram of the protective circuit according to a second embodiment of the present invention.

Refer to FIG. 4, which shows a schematic circuit block diagram of the protective circuit according to a second embodiment of the present invention. The major difference between the first embodiment and the second embodiment is that the conversion module 100B shown in FIG. 4 does not include the primary-side load signal module 102. In addition, it is to detect and determine whether the protective circuit 30B enters the protection mode by a discharge path of the secondary-side circuit 20. The protective discharge module 306' is coupled to the load detection module 302, the energy storage unit 222, the isolation switch 224, and the current detection unit 260. When the protective discharge module 306' discharges, a discharge path is formed by the output path 22, the protective discharge module 306', and the discharge path PdA of the ground path 26, or is formed by the output path 22, the protective discharge module 306', and the discharge path PdB of the ground path 26. In particular, the protective circuit 30B is further coupled to a rear capacitor (not shown) connected between the isolation switch 224 and the output port 240. In addition, the protective circuit 30B is further coupled between a front capacitor, namely the energy storage unit 222 and the isolation switch 224. When the protective discharge module 306' discharges, the discharge path PdA is formed by the energy storage unit 222, namely the front capacitor, the protective discharge module 306', and the current detection unit 260, or the discharge path PdB is formed by the output port 240, namely the rear capacitor of the isolation switch 224, the protective discharge module 306', and the current detection unit 260. Therefore, the protective discharge module 306' discharges in a periodic condition of less than 5 seconds, but not limited. When a current flows from the discharge path PdA or the discharge path PdB to the current detection unit 260, a detection voltage Vref is produced across two ends of the current detection unit 260. The load detection module 302 detects the detection voltage Vref and determines whether the detection voltage Vref is less than the determined voltage value Pv. It is similar to the first embodiment shown in FIG. 3, the protective circuit 30B in the second embodiment shown in FIG. 4 also activates the protection mode under at least two conditions. Hence, the detail descriptions of the protection mode activations are omitted here for conciseness.

Figure 5:
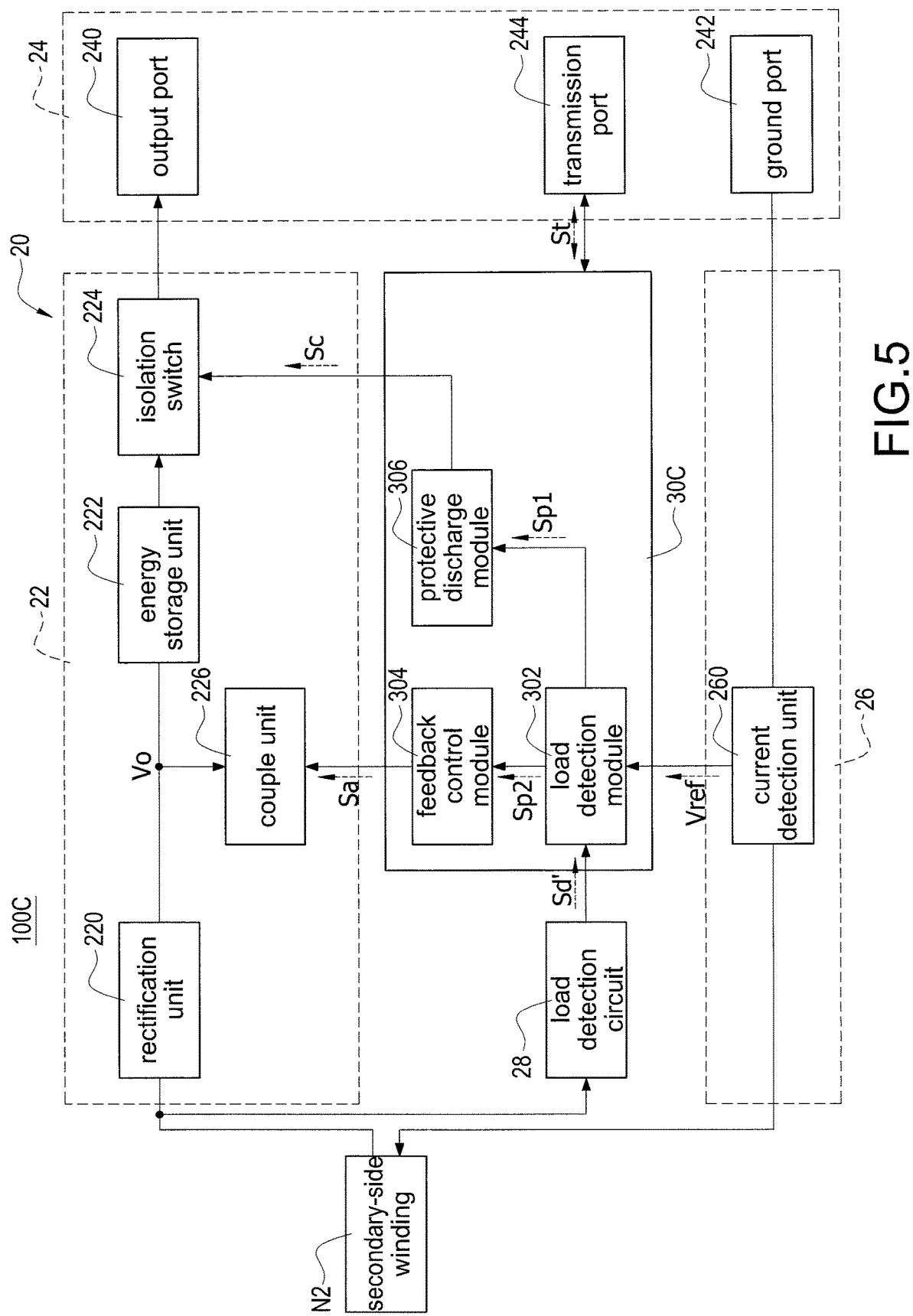
FIG. 5 shows a schematic circuit block diagram of the protective circuit according to a third embodiment of the present invention.

Refer to FIG. 5, which shows a schematic circuit block diagram of the protective circuit according to a third embodiment of the present invention. The major difference between the first embodiment shown in FIG. 3, the second embodiment shown in FIG. 4 and the third embodiment is that the conversion module 100C shown in FIG. 5 includes a load detection circuit 28. The load detection circuit 28 is coupled to the output path 22 of the secondary-side circuit 20. In addition, it is to detect and determine whether the protective circuit 30C enters the protection mode by a signal received from the secondary-side circuit 20. The load detection circuit 28 is coupled to the secondary-side winding N2, the rectification unit 220, and the load detection module 302. When the output load is increased, a switching frequency for power switches (not shown) of the primary-side circuit 10 is increased. When the load detection circuit 28 detects the increased switching frequency, the load detection circuit 28 outputs a detection signal Sd' to the load detection module 302, and the load detection module 302 detects the detection voltage Vref of the current detection unit 260 according to the detection signal Sd'. It is similar to the first embodiment shown in FIG. 3, the protective circuit 30C in the third embodiment shown in FIG. 5 also activates the protection mode under at least two conditions. Hence, the detail descriptions of the protection mode activations are omitted here for conciseness. In this embodiment, the load detection circuit 28 which can be used to determine whether the output load is increased or not should be included in the scope of this embodiment.

Figure 6:
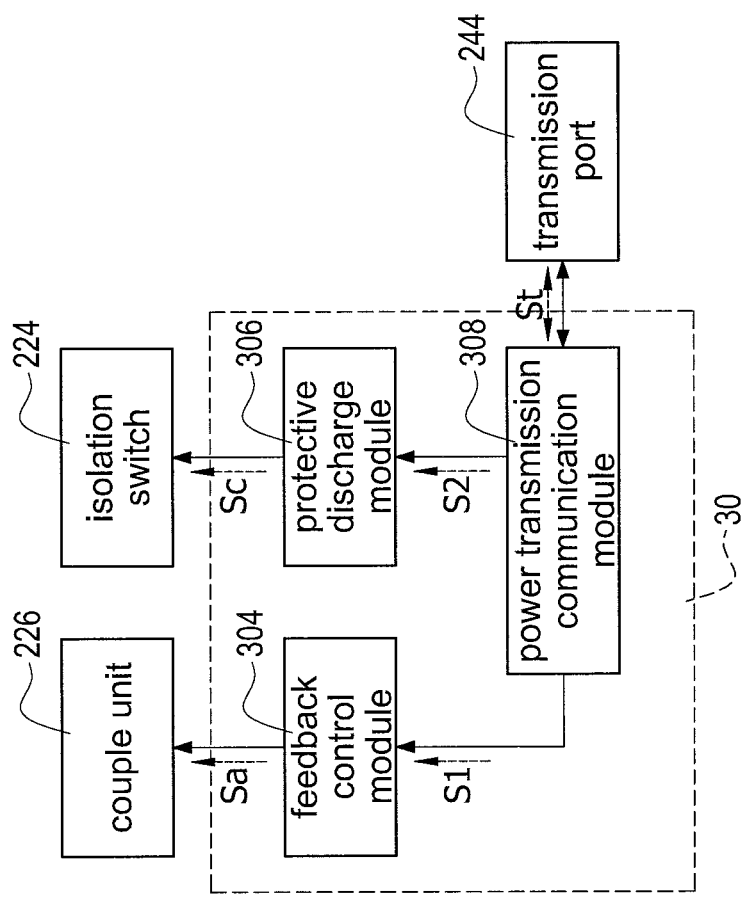
FIG. 6 shows a schematic circuit block diagram of the protective circuit having a power transmission communication module according to the present invention.

Refer to FIG. 6, which shows a schematic circuit block diagram of the protective circuit having a power transmission communication module according to the present invention. The protective circuit 30 further includes a power transmission communication module 308 coupled to the feedback control module 304, the protective discharge module 306, and the transmission port 244. When the power transmission communication module 308 receives a transmission signal St outputted from an electronic apparatus (not shown), the power transmission communication module 308 outputs a first signal S1 to the feedback control module 304. After the feedback control module 304 receives the first signal S1, the feedback control module 304 outputs the modulation signal Sa according to the first signal S1 to regulate the output voltage Vo. In particular, since the protective circuit 30 provides a function of power delivery (PD), the voltage level of the output voltage Vo can be, for example but not limited to, regulated to 5 volts, 10 volts, or 12 volts.

When the power transmission communication module 308 receives the transmission signal St outputted from the electronic apparatus (not shown) and the voltage level of the output voltage Vo is transferred from a high voltage level to a low voltage level, such as from 10 volts to 5 volts, the power transmission communication module 308 outputs the second signal S2 to the protective discharge module 306. The protective discharge module 306 releases extra energy generated during the transference of the output voltage Vo according to the second signal S2 so as to avoid damaging the conversion module 100 or the electronic apparatus connected to the conversion module 100.

In particular, the load detection module 302, the feedback control module 304, the protective discharge module, and the power transmission communication module 308 can be implemented by physical circuits, or can be integrated to implement the protective circuit 30 in a control IC. In addition, the embodiments shown in FIG. 3 to FIG. 5 can be applied to each other. For example, the primary-side load detection can be used with the discharge path PdA shown in FIG. 4 to form the conversion module 100 with a dual protection function.

To sum up, the protective circuit with low power consumption of the present invention has following advantages:

1. A single protective circuit is provided to meet both the standard of the LPS and the shorted circuit and open circuit protections of electronic components, thereby reducing costs of the electronic components.

2. The protective circuits of the LPS and the shorted circuit and open circuit protections of electronic components are combined to reduce occupied space and volume of the circuit.

3. Only the isolation switch is controlled or the couple unit is modulated by the protective circuit to simplify the design of overall circuits.

4. The basic architecture of the protective circuit is coordinated with different protective manners shown in FIG. 3 to FIG. 5 to elastically select proper protective manners according to actual conditions.

5. The power transmission communication module of the protective circuit dynamically regulates the output voltage according to requirements of the electronic apparatus.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A protective circuit with low power consumption, comprising:
   a load detection module coupled to a current detection unit;
   a feedback control module coupled to the load detection module; and
   a protective discharge module coupled to the load detection module and a switch;
   wherein the load detection module is configured to detect a detection voltage of the current detection unit; when the detection voltage detected by the load detection module is less than a determined voltage value, the protective discharge module is configured to turn off the switch to disconnect an output voltage outputted from the protective circuit;
   wherein when the switch is short circuited, the load detection module is configured to notify the feedback control module to regulate the output voltage to zero.

2. The protective circuit in claim 1, wherein the load detection module is further coupled to a primary-side load signal module; when the load detection module is configured to receive a detection signal outputted from the primary-side load signal module, the load detection module is configured to detect the detection voltage according to the detection signal.

3. The protective circuit in claim 2, wherein the protective circuit is coupled to a secondary-side circuit of a power factor correction module, and the primary-side load signal module is coupled to a primary-side circuit of the power factor correction module; when an output load is in a light-loading condition, the power factor correction module is disabled, and the primary-side load signal module fails to output the detection signal to the load detection module; when the output load is increased above a middle-loading condition, the power factor correction module normally operates, and the primary-side load signal module is configured to output the detection signal to the load detection module; the load detection module is configured to detect that detection voltage of the current detection unit according to the detection signal.

4. The protective circuit in claim 1, wherein when the protective discharge module is configured to discharge, the detection voltage is produced at the current detection unit.

5. The protective circuit in claim 4, wherein the protective circuit is coupled to a secondary-side circuit of a conversion module; when the protective discharge module is configured to discharge, a discharge path is formed by an output path of the secondary-side circuit, the protective discharge module, and the current detection unit; when a current flows to the current detection unit through the discharge path, the detection voltage is produced across two ends of the current detection unit.

6. The protective circuit in claim 1, wherein the load detection module is further coupled to a load detection circuit; when the load detection module is configured to receive a detection signal provided from the load detection circuit, the load detection module is configured to detect the detection voltage.

7. The protective circuit in claim 6, wherein the protective circuit is coupled to a secondary-side circuit of a conversion module, and the load detection circuit is coupled to a path of the secondary-side circuit of the conversion module; when the load detection circuit is configured to detect that the output load is increased, the load detection circuit is configured to output the detection signal to the load detection module, and the load detection module is configured to detect the detection voltage of the current detection unit according to the detection signal.

8. The protective circuit in claim 1, further comprising:
   a couple unit coupled to the feedback control module; when the switch is short circuited, the load detection module is configured to notify the feedback control module to regulate the output voltage to zero through the couple unit.

9. The protective circuit in claim 1, further comprising:
   a power transmission communication module coupled to the feedback control module;
   when the power transmission communication module is configured to externally receive a transmission signal, the power transmission communication module is configured to output a first signal to the feedback control module, and the feedback control module is configured to regulate a voltage level of the output voltage according to the first signal.

10. The protective circuit in claim 9, wherein the power transmission communication module is coupled to the protective discharge module; when the power transmission communication module is configured to externally receive the transmission signal to transfer the voltage level of the output voltage from a high voltage level to a low voltage level, the power transmission communication module is configured to output a second signal to the protective discharge module, and the protective discharge module is configured to release extra energy generated during the transference of the output voltage according to the second signal.

* * * * *